United States Patent [19]

Inoue

[11] 4,346,281
[45] Aug. 24, 1982

[54] METHOD OF AND APPARATUS FOR DISCHARGE-SURFACING ELECTRICALLY CONDUCTIVE WORKPIECES

[75] Inventor: Kiyoshi Inoue, Tokyo, Japan
[73] Assignee: Inoue-Japax Research Incorporated, Yokohama, Japan
[21] Appl. No.: 112,817
[22] Filed: Jan. 17, 1980
[51] Int. Cl.³ .............................................. B23P 17/00
[52] U.S. Cl. ................................................. 219/76.13
[58] Field of Search ................. 219/76.1, 76.13, 69 R, 219/69 P

[56] References Cited

U.S. PATENT DOCUMENTS

| 3,277,267 | 10/1966 | Blaszkowski | 219/76.13 |
| 3,459,917 | 8/1969 | Felts | 219/76.13 |
| 3,523,171 | 8/1970 | Belopitoy | 219/76.13 |
| 3,741,426 | 6/1973 | Inoue | 219/76.13 |

FOREIGN PATENT DOCUMENTS 661846 11/1951 United Kingdom .
926094 5/1963 United Kingdom .

OTHER PUBLICATIONS

Andreev et al., "Semi-Automatic Machine for Electric Spark Deposition of Alloys", *Machines & Tooling*, 1975, pp. 29.

Primary Examiner—C. C. Shaw
Attorney, Agent, or Firm—Karl F. Ross

[57] ABSTRACT

A method of and apparatus for the surface treatment of a metallic workpiece, e.g. the coating, hardening or other change (referred to generally as metallurgical modification) of the surface makes use of a rotating tool electrode from a shank of which individual elongated conductive pieces extend. The pieces, at rest, converge away from the shank by a spread outwardly when the tool is rotated by a motor to slap against and tangentially contact the workpiece. An electric current is provided between the tool and workpiece so that the slapping contact of the individual pieces is coupled with a spark discharge between the pieces and the workpiece surface.

28 Claims, 6 Drawing Figures

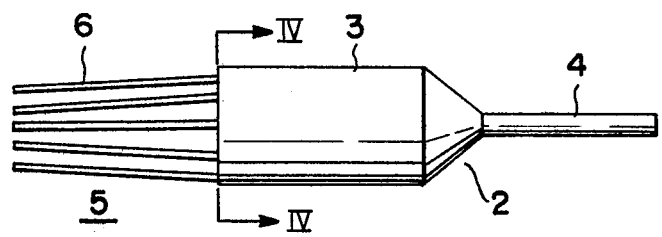
FIG. 3
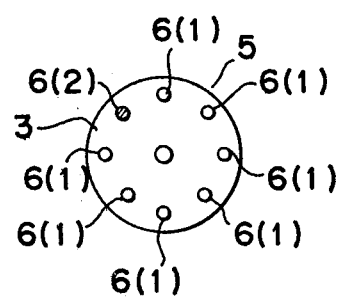
FIG. 4
FIG. 5
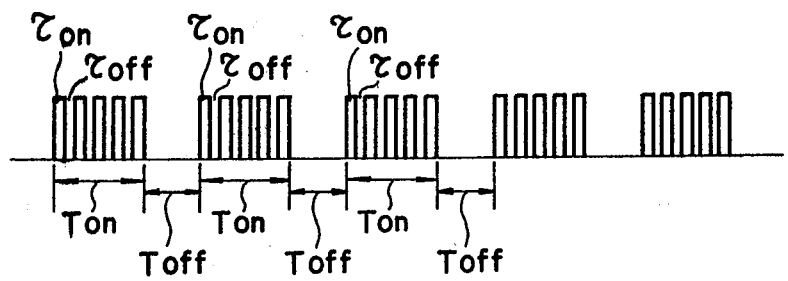

METHOD OF AND APPARATUS FOR DISCHARGE-SURFACING ELECTRICALLY CONDUCTIVE WORKPIECES

CROSS REFERENCE TO RELATED APPLICATION

This application is related (35 U.S.C. 120) to Ser. No. 026,775 filed Apr. 3, 1979.

FIELD OF THE INVENTION

The present invention relates to the surface-treatment of electrically conductive workpieces and, more particularly, to an improved method of and apparatus for providing a metallic surface with a hardened layer and for coating such a surface with a deposit of a metal or alloy different from the substrate with the aid of repeated spark discharge effected between the workpiece and an electrode urged thereagainst.

BACKGROUND OF THE INVENTION

In the spark-discharge surface-treatment technique, spark discharge is effected between an electrode and a metallic surface to be treated as they are brought into and/or out of mutual contact, with a brief electrical impulse applied between them which is of an intensity sufficient to produce localized heating of the relatively small discharge-impinging area. By sweeping such contact discharge over a selected surface region of the workpiece, a metallurgical modification or hardening of this selected surface area is obtained. Using these principles, the coating of a metallic workpiece with a metal or alloy which is different from the substrate, for example, carbide coating, can be achieved with a firm metallurgical bond between the substrate surface and the coated layer.

As shown in Japanese Patent Specification No. 32-9998 issued Nov. 29, 1957, for example a precoat layer of coating material may be applied to a workpiece surface to be treated and an electrode in the form of a solid rotary member may be moved or rolled over the precoat while urging it against the surface as an electric impulse is repeatedly applied between the electrode and the workpiece to fuse the precoat to the receiving workpiece surface at successive locations. Even without such a precoat, however, the electrode may itself form a source of coating material. An improved system and practical applications may thus result which uses the fusion-transfer of a material to a workpiece surface from the electrode in a rotary disk or similar form in sliding or tangential movement over the surface with the aid of repeated contact discharges. Such systems have likewise been well and long known in the art as described, for example, in Japanese Patent Specification No. 32-599 issued Jan. 29, 1959, No. 32-2446 issued Apr. 19, 1959, No. 32-2900 issued May 16, 1959 and No. 32-6848 issued Aug. 28, 1959. In these methods, the material fusion-transfer contact discharge can be repetitively effected by a capacitor circuit designed to charge and instantaneously discharge across the points of contact between the electrode and the workpiece and recharge as the contact region shifts from one contact to the next on points between the electrode and the workpiece. Otherwise, a mechanical or electrical switching of a continuous voltage source has been employed to provide periodically a pulsed voltage across the moving interface of the electrode and the workpiece.

In a method shown in U.S. Pat. No. 3,098,150 issued July 16, 1963, an electrode chip is repeatedly driven into contact with a workpiece, for example, under a spring force applied to the electrode held resiliently upon an electrode holder. A spark discharge is drawn between the tip and the workpiece from a charged capacitor, thereby creating a partial weld between them. Coupled with the electrode holder, there is an electromagnetic coil designed to be energized at least in part by the charging current of the capacitor or a short-circuit condition between the electrode and the workpiece. The coil is thus operable, upon the capacitor discharge, to draw the electrode tip abruptly away from the workpiece in order to break the weld and leave material from the electrode tip deposited upon the workpiece. Of course, the coating material may be disposed in advance between the electrode and the workpiece, here again, independently of the electrode material.

According to the aforementioned electrode vibration method, each metal fusion and deposit cycle is sharply controlled by the electrode reciprocation with each stroke of the cycle advantageously synchronized with capacitor discharge and recharge, thus permitting more consistent and uniform deposition than with the other prior system utilizing a rotary electrode in which contact discharges are produced randomly over the continuous contact region of the electrode and the workpiece in a continuous or intermittent displacement.

A significant disadvantage of this method has now been found to lie in the use of a capacitor, especially in conjunction with the use of vibration cycles. The vibration must be synchronized with the capacitor charge and recharge cycle, and hence requires the relative long period of each mechanical cycle. Consequently, there is a severe limitation in the frequency of discharge impulses and hence in the rate of deposition attainable. Another restriction is found also in the lack of flexibility to alter the operating parameters over a wide range as desired, which is required where a variety of electrode and workpiece materials and finishing requirements are to be met.

In summary, it may be said in practical terms that conventional spark deposition or surface treatment methods, regardless of whether they are of the vibrating or rotary type, are undesirably limited to achieve satisfactory results as regards the rate of deposition in their ability or treatment, the consistency of deposition, the stability of operation and the uniformity of the deposited surface, especially where an improvement in one is desirable without sacrifice of the others.

OBJECTS OF THE INVENTION

It is, therefore, a principal object of the present invention to provide an improved method of spark-discharge treating a metallic surface whereby a highly uniform hardened layer or deposit-coated layer of an excellent quality is provided at an increased rate and firmly to a greater thickness on the workpiece surface.

Another object of the present invention is to provide an apparatus for carrying out the method, which is stable in operation and thus insures a higher treatment speed, is consistent in operation for a desired result and allows selection of operation parameters depending upon the particular electrode and workpiece materials.

SUMMARY OF THE INVENTION

The present invention is directed to an improved method of and apparatus for the spark-discharge treating a surface of an electrically conductive workpiece by bringing the surface and an electrode together to form a localized contact therebetween, iteratively effecting a spark discharge across a gap between the electrode and the surface to form a weld at the contact area upon said surface, breaking the contact to permit the weld to cool thereby leaving a metallurgically modified area upon the workpiece surface and sweeping the electrode over the workpiece surface to successively form such metallurgically modified areas over the surface. In accordance with the present invention, the improved method comprises: forming the electrode of a plurality of electrically conductive elongate pieces fixedly mounted to a rotary shank in such a manner that they individually project axially therefrom and extend so as to collectively form a forwardly converging body of revolution; rotating the shank to cause the elongate pieces to be revolved about the axis of the shank, and urging the revolving elongate pieces along a length of their outer lateral surfaces tangentially against the workpiece surface while an electric current is applied between the elongate electrode pieces and the workpiece to bring about spark discharge between the revolving individual piece surfaces and the workpiece surface, thereby producing the metallurgically modified area where the pieces and the workpiece surface are brought together.

Preferably, the rotary shank is rotated at a rate of rotation between 50 and 20000 RPM and sufficient to cause the elongate pieces to expand uniformly outwardly toward the free ends thereof so that the forwardly converging body of revolution collectively formed by the pieces in a stationary state is expanded to assume the configuration of a cylindrical body on a forwardly divergent body of revolution.

Specifically the electrically conductive elongate pieces when mounted to the rotary shank are positioned in section in a row along an imaginary circle coaxial therewith and the number of the pieces ranges between 2 and 20. The size in diameter of the elongate pieces generally ranges between 0.1 and 2 mm, and preferably between 0.5 and 1 mm, whereas the diameter of the imaginary circle should preferably range between 2 and 8 mm. The length l in mm of each of the elongate pieces should satisfy the relationship that l/D is at least 0.5 or 1 where D is the diameter of the aforementioned circle or the diameter of the head portion of the shank.

In accordance with an important feature of the invention, the generatrix of the body of revolution collectively formed by the elongate pieces or the substantial outer lateral surface of the individual pieces whose one ends are held by the shank are used to tangentially bear against a workpiece surface to be treated. The individual electrically conductive elongate pieces which are so secured are stiff and yet resilient and accordingly, when they are revolved with the rotation of the shank, at an operating speed, are allowed to expand toward their free ends or tips so that their generatrix which is originally or in stationary state conical or truncated cone-like becomes cylindrical or forwardly divergent surfaces rapidly revolving. As a result, a continuous "beating" or "slapping" effect is created by the successive high-velocity or instantaneous tangential collisions consecutively brought about between the revolving elongate surfaces and the workpiece surface to produce a highly efficient succession of spark discharges in the region of the interface. With the delivery of electric energy between the elongate electrode pieces and the workpiece terminated and by keeping the spark continuing rotating, the elongate pieces can serve as an abrading tool capable of efficiently finishing the spark-treated workpiece surface. With the rotation of the shank stopped, the working member resumes the original configuration of the forwardly converging body of revolution.

In accordance with the apparatus aspect of the present invention an improved arrangement for spark-discharge treating a surface of an electrically conductive workpiece includes: an electrode unit comprising a rotary shank and a plurality of electrically conductive elongate pieces fixedly mounted to a rotary shank so as to individually project axially therefrom and extending so as to collectively form a forwardly converging body of revolution; motor means for rotating the shank to cause the elongate pieces to be revolved about the axis of the shank; and power supply means electrically connectable between the elongate pieces and the workpiece for effecting spark discharges between the revolving pieces and the workpiece when they are brought together to produce a metallurgically modified area the region of the workpiece surface tangentially traversed by the revolving pieces.

The power supply means may typically include a circuit for providing a series of electrical pulses across the electrode constituted by the elongate pieces and the workpiece with each pulse capable of producing a high-power spark discharge of sufficient intensity to effect a localized high-energy-density heating at the discharge-striking area. In accordance with a preferred aspect of the invention, the electrical power pulses are in the form of successive pulse trains individually consisting of elementary pulses of a frequency in the range between 1 KHz and 500 KHz, the adjacent trains of the elementary pulses being separated by a cut-off interval which occurs at a reduced frequency. It has been found that this mode of pulsing provides a highly improved result which insures a still better treated surface quality and increased removal rate.

BRIEF DESCRIPTION OF DRAWING

In the accopanying drawings:

FIG. 3 is an enlarged longitudinal side view of the electrode unit illustrated in FIGS. 1(A) and 1(B);

FIG. 4 is a cross-sectional view of the electrode unit taken along the line IV—IV in FIG. 3; and FIG. 5 is a waveform diagram illustrating a preferred form of machining (deposition or treatment) pulses which may be used with the electrode unit in accordance with the present invention.

SPECIFIC DESCRIPTION

Figure 1A:
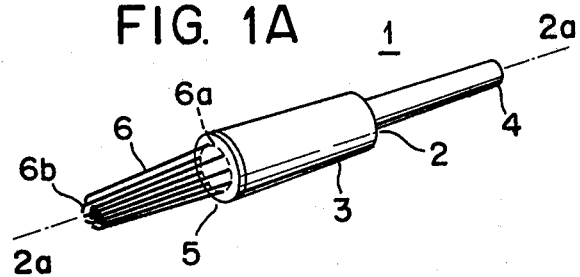
FIGS. 1(A) and (B) are diagrammatic perspective views of a spark-discharge treatment electrode unit according to the invention in stationary and rotating state, respectively.
Figure 1B:
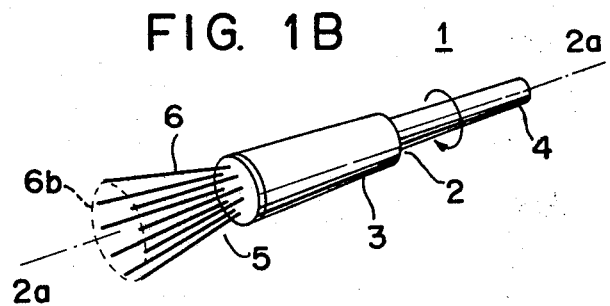

Referring to FIGS. 1(A) and 1(B), a spark-discharge depositing or treatment electrode unit 1 embodying the present invention is illustrated in stationary and rotating states, respectively. The electrode unit 1 has a shank 2 divided into a cylindrical head portion 3 and a shaft 4 coaxially secured or integral therewith and an electrode working member 5 comprising a plurality of electrically conductive elongate pieces 6 fixedly mounted to the head 3, preferably detachably through an arrangement which will be described. The shaft 4 is connected to a drive shaft of an operating motor for rotation of the electrode working member 5, the motor being indicated at 7 in FIG. 2 which illustrates the entire arrangement of a certain apparatus embodying the principles of the present invention.

With reference to FIGS. 1(A) and 1(B), 2, 3, and 4, each of the elongate pieces 6 may be a rod, wire or bristle composed of any electrically conductive substance which has conventionally been known to be suitable to constitute or can form the sparkdischarge deposition or treatment electrode. Exemplary are tungsten carbide, titanium carbide, tantalum carbide, boron carbide, boron nitride, iron-chromium alloy and piano wire materials.

The pieces 6 may each be either rounded or angular and are typically of a size in diameter between 0.1 and 2 mm and, preferably, between 0.5 and 1 mm. Such pieces may be bundled and assembled together with the head 3 so as to be arranged two to twenty in total number along the immaginary circle 6a which may then be of a diameter of 2 to 8 mm.

When the shaft 4 is rotated, the elongate pieces 6 are revolved about the axis 2a. Thus, the pieces are forced radially outwardly toward their respective free ends so that their generatrix originally of a forwardly pointed cone or truncated cone (FIGS. 1(A) and 3) forwardly expands to assume substantially a cylinder or a slightly inwardly arcuate or straight cone or truncated cone backwardly pointed (FIGS. 1(B), 2 and 5). The rate of revolution is chosen from the range between 500 and 20000 RPM. In operation the revolving pieces 6 are tangentially urged along a length of their outer lateral surfaces against a surface 8a of a workpiece 8 (FIG. 2) and successively brought into abrading contact therewith. In each cycle of revolution each piece 6 after coming out of contact with the surface 8a undergoes outward expansion and is thereby stored with a considerable kinetic energy which is then released when it comes again in colliding contact with the surface 8a and tangentially "beats" or "slaps" the latter.

Figure 2:
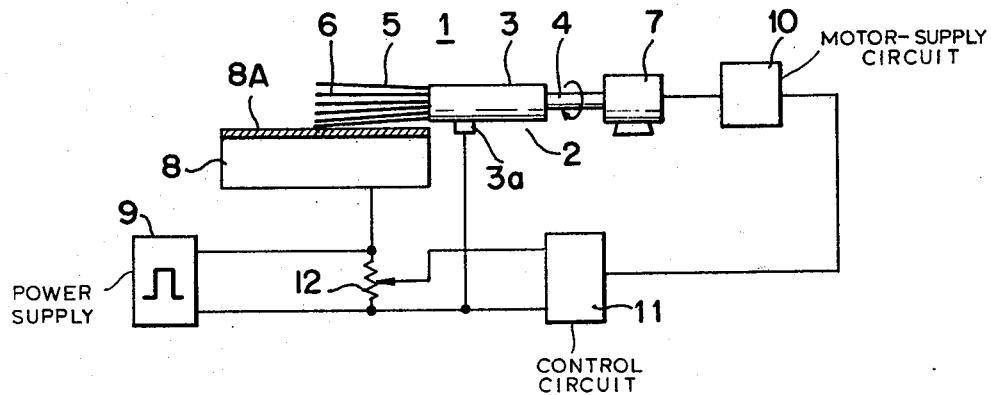
FIG. 2 is a diagrammatic view illustrating an adaptive depositing or treatment operation with an electrode unit according to the invention.

In FIG. 2 there is shown a spark-discharge deposition or treatment power supply 9 which may be of any conventional design for pulsed output and is electrically connected to the elongate electrode pieces 6 via the shank 3 and to the workpiece 8 to produce successive discrete spark discharges, when the pieces 6 are successively brought together with the workpiece 8a, through their interfacial colliding areas. Thus, a highly satisfactory metallurgically modified (i.e. deposition or hardened) layer is obtained on the surface 8a when the electrode 6a is swept over the workpiece 8 by manually or automatically displacing the supporting shank 3.

With the shank 2 of the electrode unit rotated and its working portion 5 brought into engagement with the workpiece surface 8a, the electrically conductive elongate pieces 6 which are revolving to assume a body of revolution considerably expanded centrifugally towards their free ends tend to conform to the surface 8a as they individually come in contact therewith and pass successively in sliding and abrading engagement therewith. In each cycle of revolution, each individual piece 6 after coming out of contact with the surface 8a again undergoes outward centrifugal expansion and gains considerable kinetic energy which is released when it comes again in colliding contact with the surface 8a and tangentially "beats" or "slaps" the latter. Tangentially colliding traversing of individual pieces 6 in succession under revolution provides a spark-discharge treatment or deposition on the workpiece surface 8a with an excellent quality and rate.

Machining pulses from the power supply 9 cause electrical spark discharges successively between contacting pieces 6 and the surface 8a and, when the pieces 6 are an electrically fusible material, provide fusion-transfer of the electrode material onto the workpiece surface 8a to form a deposition thereon as indicated as the hatched layer. The spark-formed deposition layer is a cumulative layer of discrete fusion-transferred deposits which is produced as the spark-discharge area is swept over the surface 8a with the movement of the electrode 6 thereover while spark discharges are successively created over the displacing interface and hence is usually characterized by the formation of minute surface irregularities. These irregularities are effectively reduced by the system of the present invention wherein the electrode member constituted by the revolving discrete pieces 6 is capable of abrading the spark-depositing or spark-deposited layer (or spark-heated layer) by virtue of the "beating" and "slapping" effect that they uniquely provide on the discharging area 8a, thereby yielding a highly satisfactory polishing or finish-treated surface. The spark deposition or metallurgical surface treatment and the unique abrading action are effected simultaneously as the revolving tool electrode 6 and the workpiece 8 to be surface-treated are under mutual sliding displacement condition.

As the surface irregularities grow in the spark-discharge or treatment process, typically, the continued deposition or treatment becomes difficult and it is even possible that continued spark discharges or the continued application of machining pulses may result in the stripping of the deposited or treated layer. Such disadvantages are effectively overcome by the aforementioned abrasive action of the electrode pieces 6 which serves to keep the spark-impinged areas smooth and to dynamically smooth the material-deposited or discretely metallurgically modified surface regions. This allows the electrode material to continuingly transfer and coat over the previously treated zones to provide a surface-hardened or material-deposited layer of a desired and greater thickness.

In FIG. 2 there is also shown a drive circuit system for operating the electrode tool unit 1 of the invention in accordance with a further aspect thereof. In this system, the state of abrading contact between the revolving pieces 6 and the workpiece 8 is detected to control the operation of the motor 7. Thus, a power supply 10 for driving the motor 7 is provided with a control circuit 11 whose input terminals are tied across a sensing resistor 12 connected in series with the spark-deposition or treatment power supply 9 and the workpiece 8 and also via a brush 3a with the shank 3 rotating at a RPM in the range already specified. The relative displacement between the tool working member 5 and the workpiece 8 may either be performed manually or automatically. In the latter case, a numerical controller of known configuration is advantageously provided to effect the relative displacement along a programmed feed path.

In the course of operation, change in contect pressure of the revolving electrode member 5 or electrically conductive elongate pieces 6 against the surface 8a will cause irregularity in abrasion which brings about irregularly applied machining pulses. This change is detected in the arrangement illustrated by monitoring electrical resistance or impedance between the contacting surfaces 6 and 8 measured as a voltage drop at the resistor 12. As the contact resistance increases with the decrease of the urging pressure, the machining current from the power supply 9 which bipasses through the resistor 12 is increased and the voltage drop at the latter is increased. Consequently, the increased contact pressure causes a decreased resistance which is measured as the increased voltage at the resistor 12. The control circuit 11 responds to change in voltage drop in the sensing, resistor 12 to control the RPM of the motor 7. Increase in RPM causes an increase in the forwardly outward expansion of the revolving elongate pieces 6 which in turn results in an increased urging pressure thereby against the contacting surface 8a and vice versa. In this manner, constancy of the abrading pressure between the tool working member 5 and the surface 8a required to obtain uniform "beating" or "slapping" effect is assured, thus permitting surface treatment and material deposition to continue at stability, with equalized surface finish over the entire working area, at an increased finishing precision and performance for a given operation.

It should be noted that instead of its output RPM, the motor 7 may alternatively have its torque controlled to maintain the contact pressure constant so that the latter may be increased and decreased with the increase and decrease of the latter, respectively. Likewise, the torque of the motor 7 may be measured to monitor change in the contact pressure. Still alternatively, any other pressure sensing means such as piezoelectric element may be disposed at a suitable tool location to manifest variation in the contact pressure to control the RPM or torque of the driver motor 7 so as to hold the contact pressure constant.

In the material deposition process, a depositable material may be supplied to the spark interface from any form of source. As is most typical, the elongate electrode pieces 6 may as noted before be composed of piano wire material, tungsten carbide, boron titanium, boron carbide or iron-chromium alloy and these materials are especially advantageous when a ferrous workpiece 8 is to be surface-hardened by deposition or treatment. These materials may also be supplied in the form of a powder, flakes or paste to be fused and deposited on the workpiece surface 8a. Alternatively, electrically conductive core electrode pieces 6 may be coated with a layer of diamond, a metal carbide, boron carbide, boron nitride or any other material whose deposition is desired on the workpiece surface for hardening and other purposes. Additionally it should be noted that any gaseous atmosphere may be used which has a component such as carbon, aluminum or nitrogen to be diffused into the substrate of the workpiece 8.

EXAMPLE I

Electrically conductive elongate pieces are composed of tungsten carbide of thicknesses between 0.1 and 1.0 mm$\phi$ and two to twenty such pieces of a given thickness are assembled to form each of various electrode units which are found to be suitable to be revolved at 50 to 20000 RPM by a motor. When working pulses of a peak current Ip of 80 amperes, a pulse duration $\tau$on of 60 to 50 microseconds are used to spark-deposite the electrode material onto a ferrous workpiece, the treated surface has a surface roughness of 10 $\mu$Rmax. The rate of deposition is four to five times faster than with the conventional vibratory or rotary system. After this deposition operation, when the spark-deposition current is diminished or terminated while the pieces continue to be revolved and held in engagement with the workpiece, a further better surface finish is observed on the treated surface. This finish operation may be conducted under modified sparking conditions. When working pulses have a peak current Ip of 50 amperes and a pulse duration of 2 microseconds and the pieces are revolved at 10,000 RP, the deposited surface has a surface roughness improved to 6 $\mu$Rmax.

In FIG. 5 there is shown a preferred form of working pulses which may be used in the present invention. The working pulses comprises a succession of pulse trains which individually consist of elementary pulses of predetermined on-time $\tau$on and off-time $\tau$off and have a duration Ton with the successive trains being separated by a cut-off time interval Toff. The on-time $\tau$on of elementary pulses ranges between 1 and 500 microseconds, preferably between 50 and 100 microseconds while the off-time $\tau$off range between 10 and 100 microseconds. The peak current of elementary pulses ranges between 50 and 100 amperes. The train duration Ton ranges between 0.1 and 100 seconds while the cut-off time interval Toff ranges between 0.05 and 50 seconds. Thus, the elementary pulses of $\tau$on and Ip in the ranges set forth each individually provide a unit of deposition or working which is relatively small but are repetitively applied at a high-frequency in each train. This results in an increased rate of deposition or treatment and a better surface roghness. During the cut-off time interval, the abrasive action by the continuing revolving electrode pieces effectively serves to reactivate and smooth the material-deposited or discharge-modified surface, thus also facilitating the continued deposition or surface treatment to a greater thickness. The current cut-off time interval also acts to quench any continuous arcing which may have occurred during the previous pulse train period and allows the discharge-heated area to be effectively cooled so that the material dislodgement due to overheating from the workpiece surface is advantageously avoided.

EXAMPLE II

A spark-discharge deposition electrode is constituted by 12 pieces of tungsten carbide wires of 0.5 mm$\phi$ assembled together in the manner described before and is revolved at 8500 RPM and brought into engagement with a ferrous workpiece. Working pulses comprising a succession of pulse trains with pulse parameters: $\tau$on=80 $\mu$s, $\tau$off=15 $\mu$s, Ip=60 A, Ton=0.5 sec and Toff=0.4 sec are applied between the revolving electrode pieces and the workpiece. This results in the firm coating on the workpiece with the electrode material at a rate of deposition of 10 to 30 grams/min·cm$^2$, which represents 10 to 30 times faster than the conventional rate of deposition in the order of 1 m gram/min·cm$^2$. The operation is continued with ease until the thickness of deposition reaches 50 to 500 microns with a surface finish (roughness) of 10 to 50 $\mu$Rmax, the values much favorably comparable with corresponding conventionally attainable values of 5 to 15 microns and 50 to 100 $\mu$Rmax.

In accordance with a further feature of the present invention, the electrically conductive elongate pieces 6 may be composed of at least two substances which are different from one piece to another or which are alloyed or otherwise combined to constitute each piece. Thus the electrically conductive elongate pieces 6 are in a major part constituted by pieces of or composed of one or more substances whose deposition is of primary interest and which may additionally be constituted by pieces of or composed of one or more substances which are alloyable or otherwise combinable with the primary substance when the two sorts of substances are fused from the electrode pieces 6 and transferred onto the workpiece surface 8a during the spark-deposition process. This aspect of the present invention is designed to overcome the conventional difficulties to attain a greater thickness of deposition onto the workpiece surface from the electrode or the problem arising at least in part from the insufficient diffusion-bond between the electrode material and the workpiece substrate material, the difficulty of combination of material between the previously applied deposits and those subsequently applied, and a certain minimum extent of surface irregularities which can best be attained.

Referring to FIG. 4 the major part of electrically conductive elongate pieces 6(1) may thus be composed, for example, of WC-Co and the rest 6(2) may then be composed, for example, of Ni which constitutes an alloying element. More generally, when the pieces 6(1) are composed of WC, $B_4C$ or BN as a desired depositing material, the piece or pieces 6(2) should be composed of Ag, Ni, Cu, Fe, Au, Cr, Co and Mn individually or in combination. The relative numbers of pieces 6(1) and 6(2) and arrangement thereof are selected depending on a particular kind of base material and a particular nature of deposition desired. Taking An example of Ni alloying substance piece 6(2) for WC-Co primary deposition substance pieces 6(1), these substances fuse and transfer onto the workpiece 8 during each revolutionary cycle of the electrode working member 5. As a result, an Ni layer is formed between adjacent WC-Co layers and establishes a diffusion bond between them. Additionally the Ni layer serves to cover and protect the WC-Co deposition from reacting with the atmosphere to prevent its degeneration and, by fusing therewith, helps densification of the deposit of the coating material.

The proportion of pieces 6(1) of coating material relative to pieces 6(2) of alloying or combining material is selected to attain an optimum result. For example, Ni pieces are included in an assembly relative to main W-Co pieces at a proportion ¼, 1/6, 1/7, ⅛, 1/10 or 1/15 depending on the total number of pieces and their interspacing used.

EXAMPLE III

An electrode unit is prepared having a configuration generally shown in FIGS. 3 and 4 and with six pieces of WC-Co material and single piece of Ni material. The electrode unit is revolved at 5000 RPM and brought into engagement with a ferrous workpiece. When spark-discharge pulses are applied between the electrode and the workpiece with pulse conditions: $Ip=80$ A, $\tau on=50$ μs and $\tau off=30$ μs, the electrode material is deposited on the workpiece surface at a rate of 22 mg/min, which is more than 10 times faster than the deposition with a conventional vibratory or rotary electrode system.

It should be noted that various combinations of primary depositing substances and auxiliary substances are not limited to those listed hereinbefore but are extensively applicable. Thus, any hardening material can be used with a suitable bonding material and any depositing material for other purposes may be used with a diffusion material. Any alloy or composite layer may be provided on a workpiece surface by spark-discharge fusion-transfer of constituent substances individually composing separate electrically conductive elongate pieces.

While the particular importance of tungsten carbide spark deposition has long been recognized and is very favorably met by the herein disclosed process and apparatus, the present invention is equally applicable for spark hardening using other materials as well with excellent results as described hereinbefore. It is also useful not only for surface hardening but for various other purposes including the application of a corrosion-resistance and wear-resistance coatings (e.g. stellite deposition). Furthermore, piano wires, hard steel wires and manganese steel wires commercially available can readily be used as electrode pieces to metallurgically surface-treat a steel workpiece which has previously been machined or deformed.

It should also be noted that the present invention allows spark deposition or treatment even over spacially limited areas such as a recess which are practically not accessible with a conventional vibratory or rotary electrode tool.

There is thus provided an improved method of spark-discharge surfacing electrically conductive workpieces as well as an apparatus for carrying out the method, which provides an increased removal rate, better surface finish, operating convenience, firm material deposition, an improved stability of operation and other advantages.

What is claimed is:

1. In a method of discharge-treating a surface of an electrically conductive workpiece by bringing said surface and an electrode together to form a localized contact therebetween, iteratively effecting a spark discharge across a gap between said electrode and said surface to form a weld at the contact area upon said surface, breaking said contact to permit said weld to cool thereby leaving a metallurgically modified area upon said surface and sweeping said electrode over said surface to successively form such metallurgically modified areas over said surfaces, the improvement which comprises: forming said electrode of a plurality of electrically conductive elongate pieces fixedly mounted to a rotary shank so as to individually project axially therefrom and extending so as to collectively form a converging body of revolution axially opening away from said shank and with said pieces lying along generatrices of the body of revolution; rotating said shank to permit said elongate pieces to be revolved and to uniformly expand the body of revolution outwardly toward the ends of said pieces remote from said shank while revolving; urging the outer lateral surfaces of said revolving pieces along a length thereof tangentially against said workpiece surface and so that the expanded body of revolution is tangential to said surface while an electric current is applied between said pieces and said workpiece to bring about spark discharge between said revolving individual surfaces of pieces and said workpiece surface thereby creating said metallurgically modified area where said pieces and said workpiece are brought together.

2. The improvement defined in claim 1 wherein said elongate pieces are each of a size in diameter between 0.1 and 2 mm.

3. The improvement defined in claim 2 wherein said size in diameter is between 0.5 and 1 mm.

4. The improvement defined in claim 2 or claim 3 wherein said elongate pieces are arranged 2 to 20 in number along a circle.

5. The improvement defined in claim 1 wherein said elongate pieces are individually projected by a length l in mm from said shank and arranged along the circle of a diameter of D in mm, l/D being at least 0.5 to 1.

6. The improvement defined in claim 5 wherein said diameter D is in the range between 2 and 8 mm.

7. The improvement defined in claim 1 wherein said shank is rotated at a speed in the range between 50 and 20000 RPM.

8. The improvement defined in claim 1 wherein said shank is operatively connected to a drive shaft of a motor, further comprising the steps of detecting contact pressure between said elongate pieces under revolution and a workpiece to be treated and controlling, in response to said detection, said motor so as to maintain said contact pressure substantially constant.

9. The improvement defined in claim 8 wherein said contact pressure is detected by sensing electrical resistance or impedance between said elongate pieces and said workpiece.

10. The improvement defined in claim 8 wherein said contact pressure is detected by sensing the torque of said motor.

11. The improvement defined in claim 8 wherein said motor is controlled by controlling the rate of rotation thereof.

12. The improvement defined in claim 8 wherein said motor is controlled by controlling the torque thereof.

13. The improvement as defined in claim 1, further comprising the step of terminating the application of said electric current while continuingly rotating said shank to permit said elongate pieces to continue, to be revolved while in engagement with said workpiece surface, thereby abrasively finishing the treated workpiece surface.

14. The improvement defined in claim 1 wherein said electric current is in the form of discrete pulses.

15. The improvement defined in claim 14 wherein said pulses are applied in the form of a succession of pulse trains, said trains each consisting of a number of elementary pulses of predetermined on-time and off-time and having a predetermined duration, said successive trains being separated by a predetermined cut-off interval.

16. The improvement defined in claim 15 wherein said elementary pulses have said on-time in the range between 1 and 500 microseconds and said off-time in the range between 10 and 100 microseconds while said pulse trains have said duration in the range between 0.1 and 100 seconds and said cut-off interval in the range between 0.05 and 50 seconds.

17. The improvement defined in claim 14, claim 15 or claim 16 wherein said pulses have a peak current in the range between 50 and 100 amperes.

18. The improvement defined in claim 1 wherein a major part of said elongate pieces are composed of a material selected for deposition on said workpiece surface and the remainder thereof are composed of at least one substance different from said material.

19. The improvement defined in claim 18 wherein said material is one selected from the group consisting of metal carbide, boron carbide and boron nitride and said at least one substance is one selected from the group consisting of silver, nickel, copper, iron, gold, chromium, cobalt and molybdenum.

20. An apparatus for modifying the surface of a metallic workpiece, comprising:
an electrode tool having a rotatable shank and a plurality of angularly spaced electrically conductive elongate pieces fixed to said shank and individually projecting axially thereof so as to collectively form a body of revolution converging axially away from said shank, said pieces lying along generatrices of said body of revolution;
a motor operatively connected to said shank for rotating said tool and thereby uniformly expanding said body to urge outer lateral surfaces of said pieces generally tangentially and successively into individual contact with a surface of a metallic workpiece juxtaposed with said tool; and
a source of an electric current connected across said tool and said workpiece for effecting a spark discharge between the individual pieces and said workpiece as said pieces contact said workpiece, thereby metallurgically modifying at least regions of said surface contacted by said pieces.

21. The apparatus defined in claim 20 wherein said elongate pieces have diameters between 0.1 and 2 mm.

22. The apparatus defined in claim 21 wherein said diameters are between 0.5 and 1 mm.

23. The apparatus defined in claim 22 wherein the number of said pieces carried by said shank is two to twenty.

24. The apparatus defined in claim 20 wherein said pieces are spaced apart along a circle of a diameter D and have a length l such that the ratio l/D in millimeters is at least 0.5.

25. The apparatus defined in claim 24 wherein said diameter is between 2 and 8 mm.

26. The apparatus defined in claim 20, further comprising means responsive to the engagement of said pieces with said workpiece and connected to said motor for maintaining the contact pressure of said tool against said workpiece substantially constant.

27. The apparatus defined in claim 20 wherein at least part of at least some of the pieces of said tool is formed with abrasive material.

28. The apparatus defined in claim 20 wherein said source is a generator of discrete electrical pulses.

* * * * *